J. A. DONNELLY.
CHECK VALVE.
APPLICATION FILED FEB. 18, 1916.

1,366,171. Patented Jan. 18, 1921.

Inventor
James A. Donnelly
By his Attorney

UNITED STATES PATENT OFFICE.

JAMES A. DONNELLY, OF BROOKLYN, NEW YORK.

CHECK-VALVE.

1,366,171. Specification of Letters Patent. Patented Jan. 18, 1921.

Application filed February 18, 1916. Serial No. 79,028.

*To all whom it may concern:*

Be it known that I, JAMES A. DONNELLY, a citizen of the United States, and a resident of Brooklyn, in the county of Kings and State of New York, have invented certain new and useful Improvements in Check-Valves, of which the following is a specification.

The invention relates to valves for regulating the flow of fluids, more particularly to valves of the check type, designed to permit of a flow in one direction only. Of the three general classes of valve construction, to wit—rotary, sliding and reciprocatory, the latter type only is adapted for use as a check valve. Two classes of seats and disk are employed in these valves, namely, one in which both seat and disk are of hard or unyielding material, and the other in which either the seat or the disk is of soft or yielding material. Moreover, the form of the disk and seat at the point where the closure is to be made is usually such as to effect a closure in one of two ways: either through a flat surface, or through a surface at an angle, usually about 45°.

It is a well-known fact that it is much more difficult to effect a tight closure with check valves than with the ordinary reciprocatory valves closed by mechanical means. In the latter type, it is possible to so arrange the valve member that it may be forced upon its seat with any desired amount of mechanical stress or pressure. From the nature of a check valve, of course, this is impossible, as the valve must be arranged to open automatically in the direction of the pressure and flow, and similarly, to close by a reversal of the same. If the difference in pressure tending to open the valve be considerable, the reversal of the effect of this difference will be to provide a considerable force to push the disk to the seat. This, however, will not necessarily tend to make the valve tighter, as the difference in pressure against which the valve is to be tight, is increased in the same proportion as the force tending to close the valve; and it is well known that it is much more difficult to make a check valve tight against comparatively low differences in pressure than against high differences in pressure. This may be due to the fact that it is possible for small and comparatively soft pieces of dirt and foreign matter to lodge between the disk and seat and which will not be crushed by a low pressure, whereas they may be flattened out by a higher pressure, or even molded into the disk, if it be a soft one.

Heretofore, the practice in manufacturing check valves has been to construct both the valve member or disks and the seats of the same material and in the same manner as in the case of reciprocatory valves closed and held shut by mechanical means. Check valves, however, must be made with much more care than the ordinary reciprocatory valves in order to be tight against the return pressure, and the disk must aline itself very accurately to the seat. This is more readily effected with a vertically rising disk than with one constructed to reciprocate horizontally, as is usual with swing check valves. The latter are preferable, however, to the lift check valves, requiring less pressure to open, and being less liable to trouble from dirt or other foreign matter lodging upon the seat, as said matter will tend to drop therefrom by gravity. It is not possible with the average mechanic, however, to invariably install these valves in the proper position; and it is necessary, moreover, to frequently place the valve in piping having more or less pitch so that it may not be always erected in proper position with respect to its transverse axis. All this affects the proper registry of the disk with its seat. To secure proper alinement, a conical form of disk and seat is of considerable advantage, the corresponding angles of the disk and seat being approximately 45° at the points of contact; the former being guided to always properly register with the latter when completely closed.

In the manufacture of this type of swing check valves, having a conical disk projecting into or through the valve seat, the several parts are made as accurately as possible to reduce lost motion or clearance of the swinging disk to a minimum; but, as it is very difficult, if not impossible, to insure perfect workmanship, an accurate register of the surfaces is not generally obtained.

The present invention has for its object a novel method of manufacturing the coöperating valve members of said conical type of check valve to effect a fluid tight junction between the same; and the nature of the invention will be best understood when described in connection with the accompanying drawings, in which—

Similar characters of reference designate corresponding parts throughout the several views.

Figure 1:
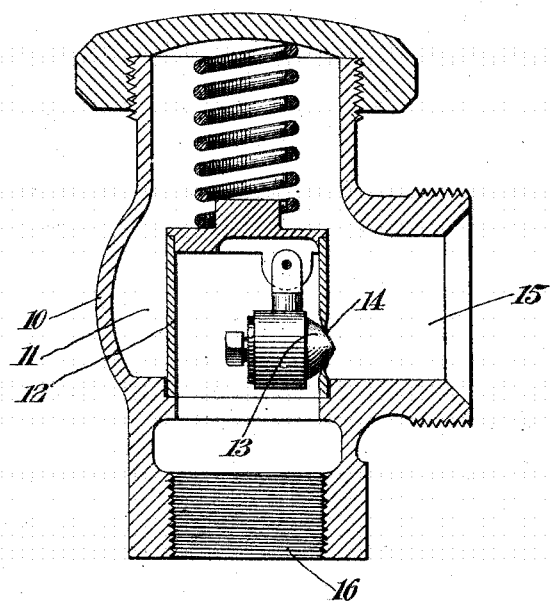
Figure 1 is a vertical section through the valve.

In carrying out the invention, a valve body 10 is provided to form a casing 11 in which is mounted a cylindrical member 12 carrying a pivotally mounted, or swinging conical disk or valve member 13 which is adapted to pass into and close a circular opening of the wall of said cylinder which provides the seat 14 for the conical disk 13. The valve body 10 is further provided with an inlet 15 and outlet 16, the valve thus far described being substantially similar to the type disclosed in my prior U. S. Patent No. 974245 of November 1st, 1910. The invention, however, is not to be understood as being restricted to this particular type of valve, which is merely set forth as an example.

Figure 2:
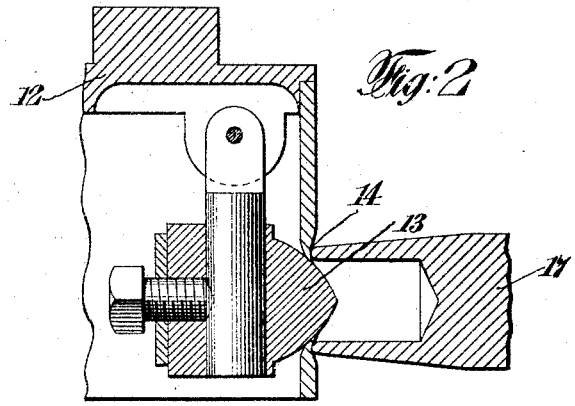
Fig. 2 is a detail view.

The seat 14, however, is beveled from each side, so that the metal thereof is comparatively thin, especially near the edge of the opening. The conical angle of the disk 13 where it registers with the seat is made somewhat steeper than the conical angle of the valve seat, and is shown more particularly in Fig. 2; and the said disk is then mounted in the cylinder 12 in manner to swing freely toward its said seat and arranged to register as accurately as possible therewith. When this is effected, the cylinder as a whole is placed on a small anvil (not shown) so that the disk is held firmly to its seat, whereupon the latter is shaped over the former by means of a hollow soft metal punch 17 placed over the seat and lightly struck with a hammer. This properly swages the attenuated material of the seat over the conical form of the disk, and a perfect contact between the two is effected and provides for a proper registry between disk and seat, even though the said valve be not located exactly level in the piping.

I claim:

1. In the manufacture of check valves embodying a seat and swinging disk therefor: the method of effecting an accurate fit between the said seat and disk, which consists in retaining the disk temporarily in its closing position and swaging the seat of the valve about the same to cause the former to conform substantially to the shape of said disk, and effect a proper closure of the valve upon subsequent coöperation of disk and seat.

2. In the manufacture of check valves embodying a seat and swinging disk therefor: the method of effecting an accurate fit between the said seat and disk, which consists in reducing the thickness of the material toward the edge of the opening therethrough, retaining the disk temporarily in its closing position and swaging the attenuated material of the seat about said disk to conform to the shape of the latter, and effect a proper closure of the valve upon subsequent coöperation of disk and seat.

3. In a check valve, embodying a seat member provided with an opening whose edges are of reduced thickness and affording a valve seat, a conical swinging disk member extending into said opening, the attenuated seat material surrounding the opening being adapted to fit about and conform exactly to the said disk member.

Signed at New York, in the county of New York and State of New York this 16th day of February, A. D. 1916.

JAMES A. DONNELLY.

Witness:
J. M. BACHMANN, Jr.